Dec. 17, 1940.  O. J. HOLMES  2,225,219
FILTER AND SOUND GATE MECHANISM
Filed May 28, 1937  5 Sheets-Sheet 4
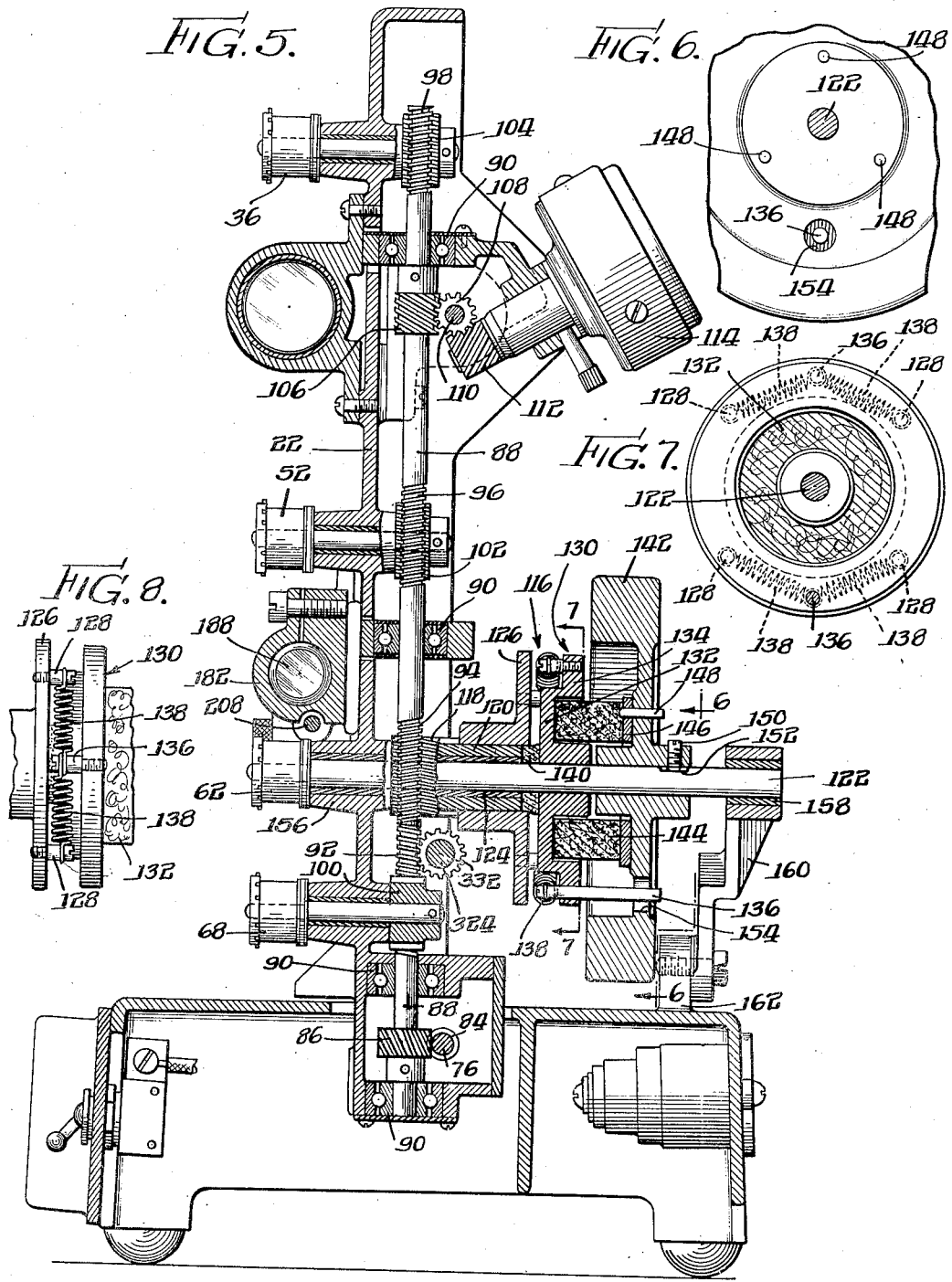
Inventor
Oscar J. Holmes
By:- Cox & Moore attys Dec. 17, 1940.    O. J. HOLMES    2,225,219
FILTER AND SOUND GATE MECHANISM
Filed May 28, 1937    5 Sheets-Sheet 5
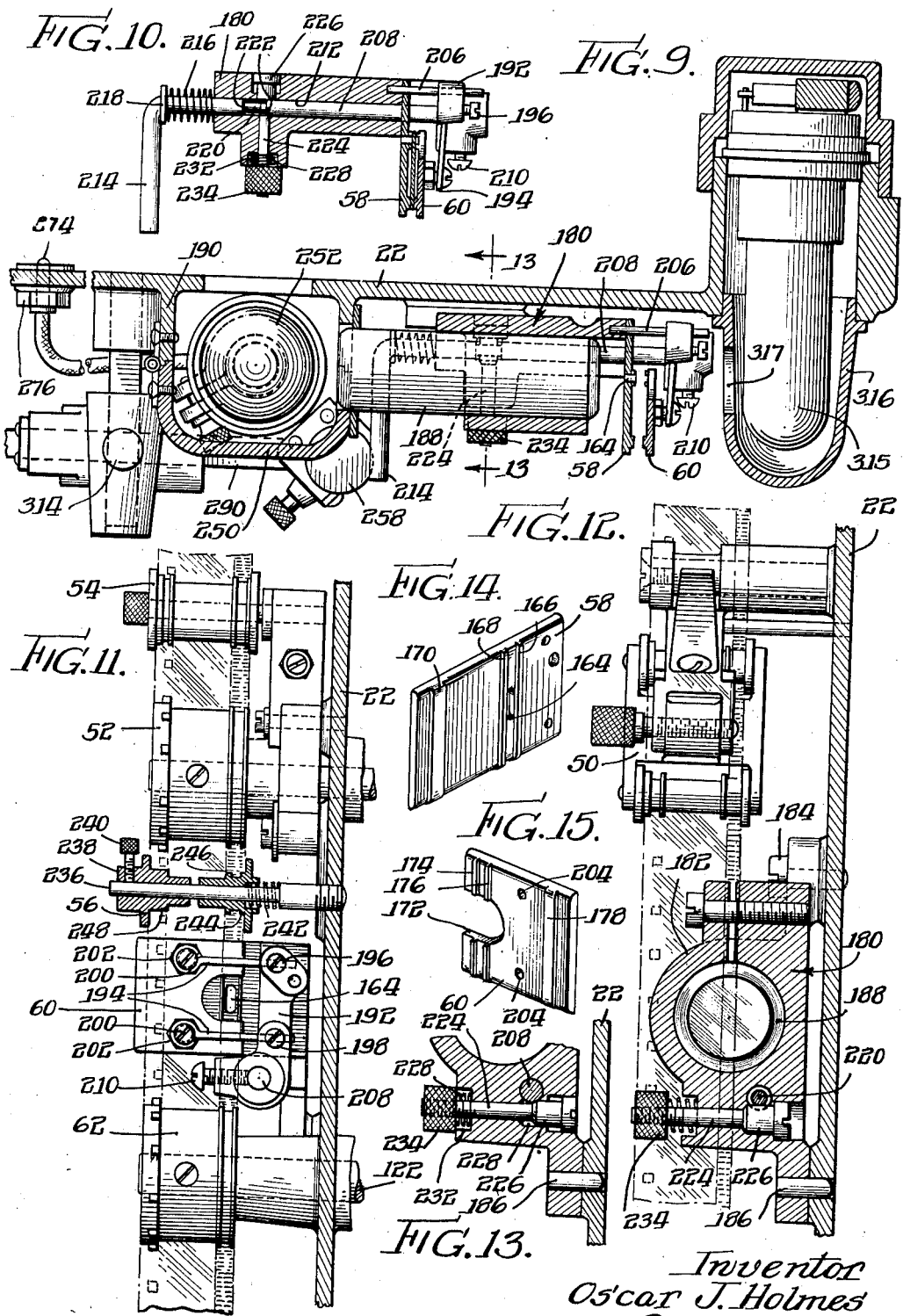
Inventor
Oscar J. Holmes
By:- Cox & Moore attys Patented Dec. 17, 1940

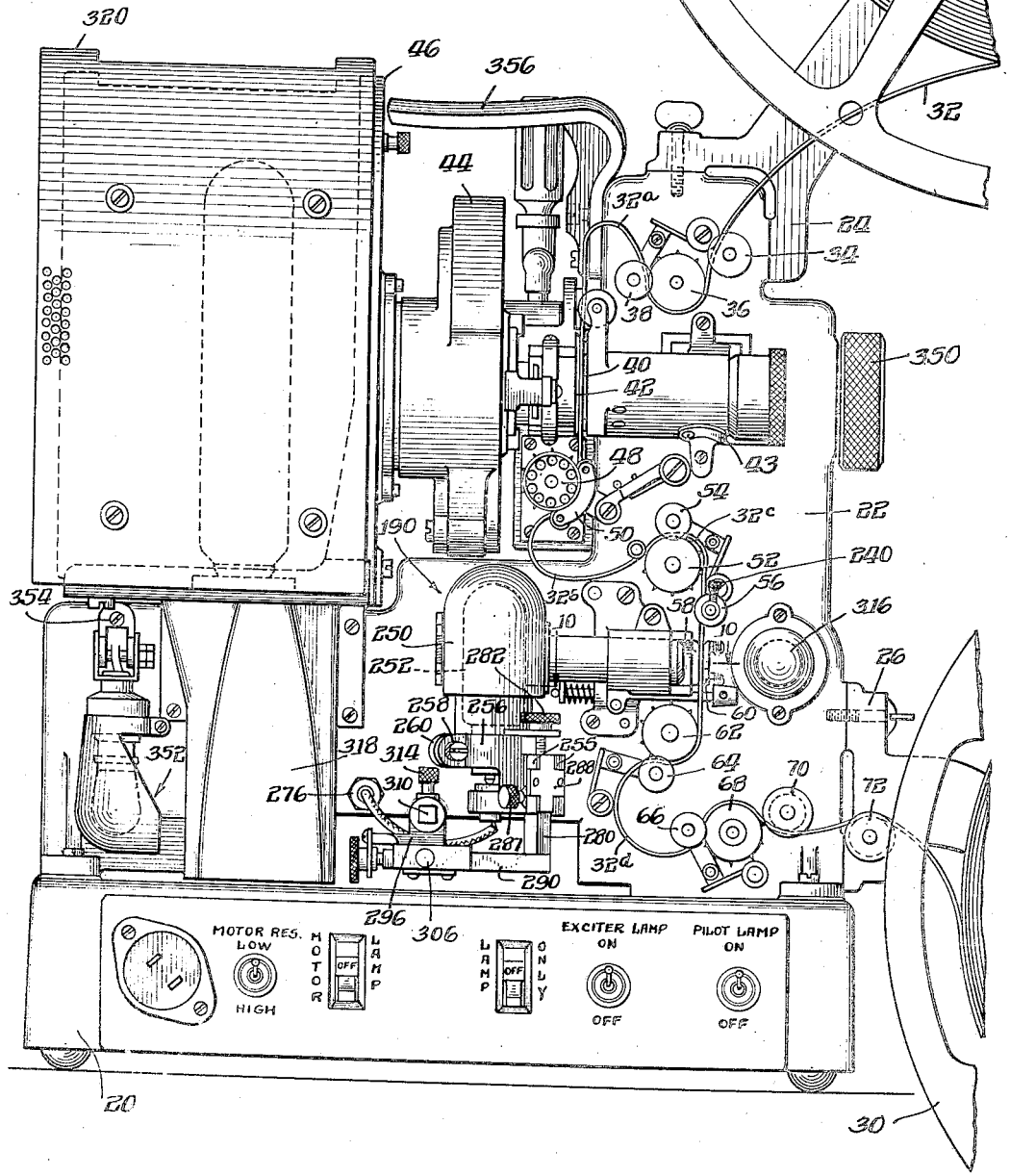

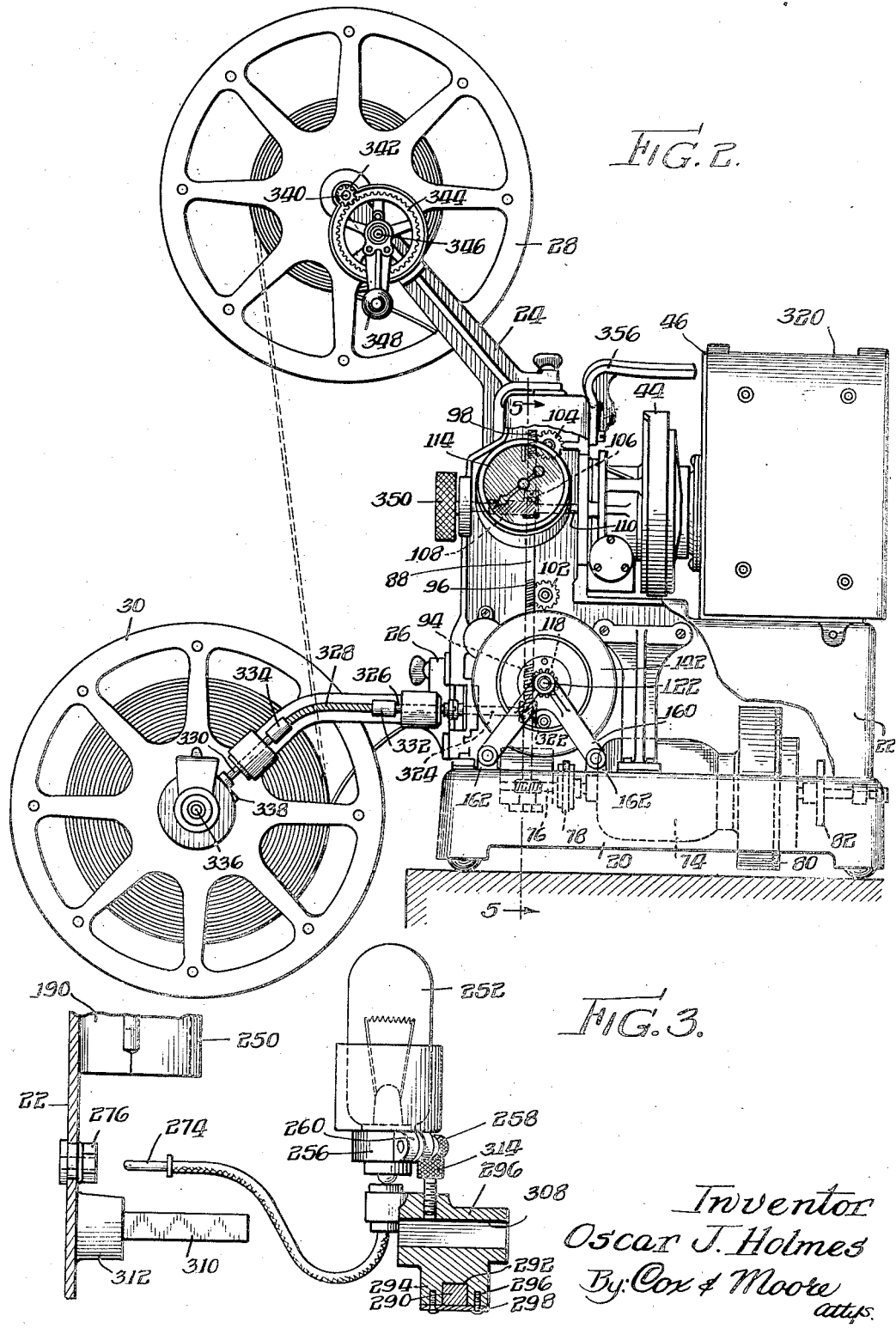

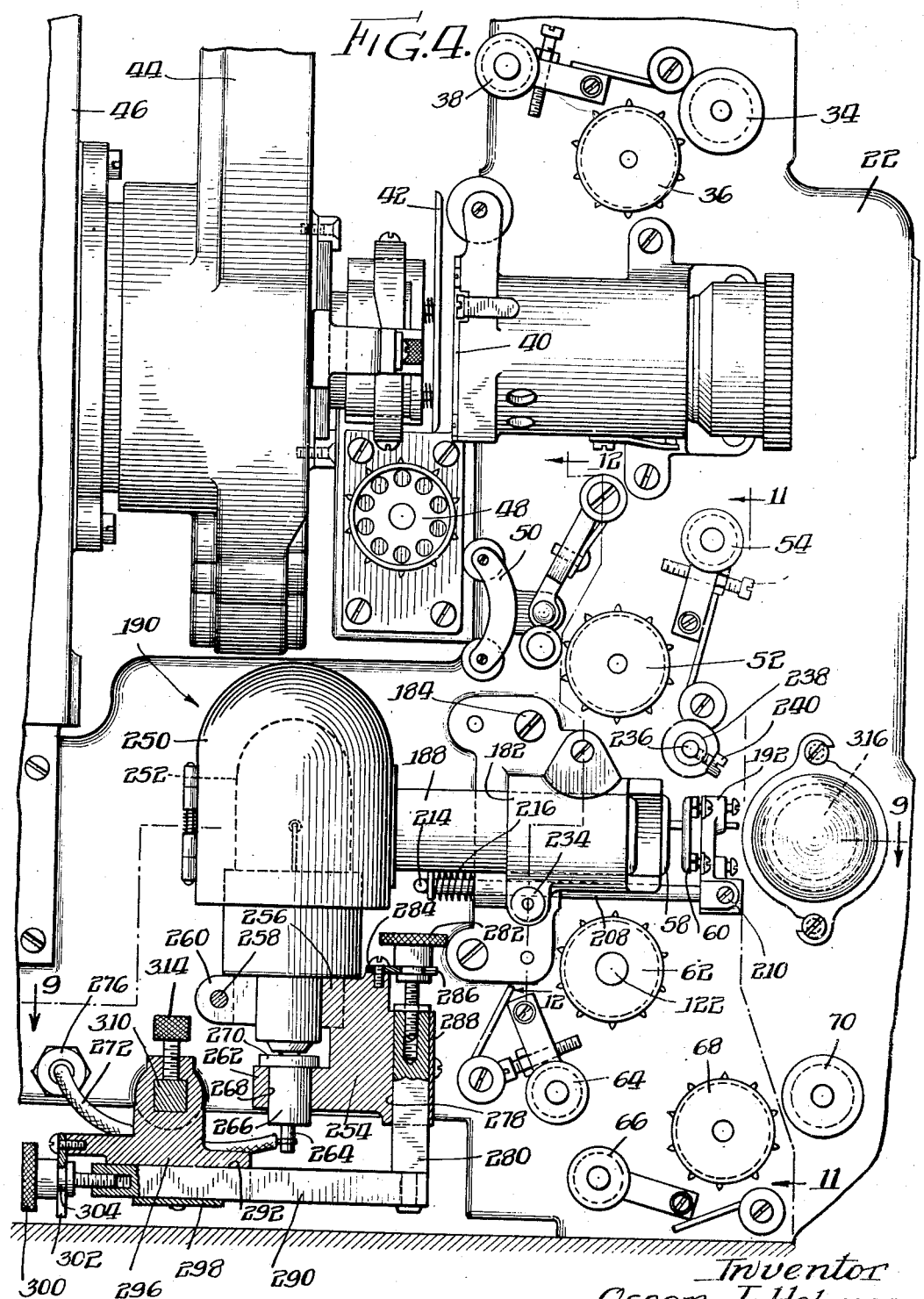

2,225,219

UNITED STATES PATENT OFFICE 2,225,219

FILTER AND SOUND GATE MECHANISM

Oscar J. Holmes, Chicago, Ill.

Application May 28, 1937, Serial No. 145,314

9 Claims. (Cl. 271—2.3)

This invention relates to film projectors or cameras, with more particular reference to a filter mechanism of general applicability in connection with such projectors or cameras, and to a sound gate mechanism and exciter lamp construction for the sound-on-film type of projectors. The invention has specific relation to a 16-m.m. sound-on-film projector with which said mechanisms and lamp are associated.

Conventional, present day equipment for motion picture projectors or cameras possesses serious disadvantages in connection with the noise and flutter introduced by the driving mechanism. Certain means have heretofore been proposed to eliminate the flutter occasioned by the variations of speed of the driving mechanism, but such flutter-preventing means are only partially capable of accomplishing the intended purpose and are particularly affected by the different operating conditions encountered in different localities. Furthermore, such heretofore proposed flutter-preventing means transmit to the film-driving sprocket the noise generated in, and the vibration of, the driving mechanism.

It is a very important object of applicant's invention to provide a filter mechanism of improved construction, free from the above stated disadvantages and insufficiencies, which shall be adjustable properly to eliminate flutter occasioned by the drive mechanism, and also capable of eliminating the noise generated in, and the vibration of, the sprocket driving mechanism.

It is a further object of applicant's invention to provide such a filtering mechanism as above stated, in which the various operative elements or parts are susceptible to ready disassembly and replacement.

It is a still further object of applicant's invention to provide a yieldable, resilient filtering mechanism including safety means for preventing destructive relative displacement of the yieldable and resilient elements comprising the same.

A further very important object of applicant's invention is the provision of a "full floating" sound gate, self adjustable to accommodate the film and to apply the proper pressure or tension thereto, particularly with reference to 16-m.m. film; which sound gate, by reason of its "floating" construction, shall be capable of preventing "ripple" noises generated in conventional sound projector equipment by the laterally deflected edges of the film sprocket openings.

A further object of applicant's invention is to provide a sound gate for 16-m.m. sound-on-film projectors which shall be light in construction, flexible in character, and well adapted for the projection of film of such size.

A further important object of applicant's invention is to provide a simplified and compact mounting for the exciter lamp of a sound-on-film projector, which mounting shall be capable of adjustment in three directions, properly to aline and position the exciter lamp with respect to the sound gate, the film and the photoelectric cell.

A further important object of the invention is to provide an exciter lamp mounting which shall be quickly removable with the lamp as a unit to permit substantially instantaneous replacement of the exciter lamp.

Other and further important objects and advantages of the invention will be apparent from the description which follows, when taken in connection with the accompanying drawings, wherein:

Fig. 1 is a side elevational view of a sound-on-film motion picture projector embodying the invention.

Fig. 2 is an elevational view of the opposite side of the projector from that shown in Fig. 1.

Fig. 3 is an elevational view partly in section of the exciter lamp and mounting.

Fig. 4 is an enlarged fragmentary elevation similar to Fig. 1.

Fig. 5 is a vertical section taken along the line 5—5 of Fig. 2.

Fig. 6 is a fragmentary view in elevation and section taken along the line 6—6 of Fig. 5.

Fig. 7 is a view in vertical section taken along the line 7—7 of Fig. 5.

Fig. 8 is an edge view of the mechanism shown in Fig. 7.

Fig. 9 is a fragmentary, horizontal section taken along the line 9—9 of Fig. 4.

Fig. 10 is a detail, horizontal section through the sound gate and mounting taken along the line 10—10 of Fig. 1.

Fig. 11 is a fragmentary vertical section taken along the line 11—11 of Fig. 4.

Fig. 12 is a fragmentary vertical section taken along the line 12—12 of Fig. 4.

Fig. 13 is a fragmentary vertical section taken along the line 13—13 of Fig. 9.

Fig. 14 is a perspective view of the fixed element of the sound gate.

Fig. 15 is a view in perspective of the movable element of the sound gate.

Referring now to the drawings more in detail, wherein like numerals have been employed to designate similar parts throughout the various figures, it will be seen that I have disclosed for illustrative purposes a motion picture sound-on-film projector having a suitable base 20 upon which is mounted a body casting 22 supporting a pair of reel brackets 24 and 26. A supply reel 28 is mounted upon the bracket 24 and a take-up reel 30 is mounted upon the bracket 26, the brackets 24 and 26 being readily detachable from the body casting 22 for the purpose of facilitating transportation of the projector.

From the supply reel 28, film 32 passes over a guide roller 34 to and around a feed sprocket 36, in engagement with which the film is held by a releasable tension roller 38. From the roller 38 the film is threaded through a pair of picture aperture gates 40 and 42, a suitable loop 32a being provided between the roller 38 and these aperture gates. The aperture gate 40 is carried by a projector lens housing 43, suitably mounted on the body casting 22. The aperture gate 42 is adjustably mounted upon the front of a casting 44, in which are mounted suitable light controlling shutters (not shown), in alinement with suitable light projecting lenses carried by a ventilated lamp housing 46, the housing 46 being secured to the rear portion of the body casting 22.

From the picture gates, the film 32 passes to an intermittently driven picture sprocket 48 with which the film is held in contact by a spring-pressed releasable shoe 50, and from the sprocket 48 to a take-up drive sprocket 52, a suitable loop 32b being provided between the sprockets 48 and 52 to permit the film to be driven at a constant speed by the sprocket 52 while the sprocket 48 moves the film only intermittently. A spring-pressed roller 54 maintains the film in engagement with the sprocket 52. The film 32 is threaded from the sprocket 52 over a guide roller 56, through fixed and movable light aperture sound gates 58 and 60, respectively, to a sound sprocket 62, a one sprocket hole loop 32c being provided between the sound gates and the sprocket 52. A spring-pressed roller 64 maintains the film in engagement with the sound sprocket 62, and from the roller 64 the film passes between a spring-pressed roller 66 and a take-up sprocket 68 and thence over idler rollers 70 and 72 to the take-up reel 30, a loop 32d being provided between the sprockets 62 and 68.

A motor 74 (Fig. 2) mounted in and upon the base 20 drives a shaft 76 through a flexible joint 78 and also drives an air pump (not shown) mounted in a housing 80 and a centrifugally operated governor switch 82. The shaft 76, through a worm gear 84 and a worm wheel 86 (Fig. 5), drives a vertical shaft 88 journaled in suitable, spaced antifriction bearings 90 mounted in any suitable manner upon the body casting 22 as shown in Fig. 5. The shaft 88 is provided at spaced points with pressed teeth forming gears 92, 94, 96 and 98. Gears 100, 102 and 104, mounted upon suitable stub shafts journaled in the body casting 22, engage the gears 92, 96 and 98, respectively, thereby driving their associated sprockets 36, 52 and 68. A gear 106 secured to the shaft 88 meshes with a gear 108 secured to a shaft 110 and the gear 108 meshes with a gear 112 of a tachometer 114 carried by the body casting 22. The shaft 110 through suitable mechanical connections described in the copending application of Oscar J. Holmes, Serial No. 127,709, filed February 25, 1937, drives the picture sprocket 48 intermittently and the light controlling shutters mounted in the casting 44 of Fig. 1.

The sound sprocket 62 is driven through a filter mechanism 116 now to be described. This filter mechanism is driven by the shaft 88 through the gear 94 by means of a gear 118, the teeth of which are pressed into a sleeve 120 journaled on a shaft 122 by means of a suitable bearing or bushing 124. The sleeve 120 is press fitted to a flanged collar or disk 126 which is provided with, or threadedly receives, a plurality of angularly disposed, axially extending pins 128, as best seen in Figs. 5 to 8. An intermediate disk 130 is provided with a central disk-like portion 132 and an offset annular portion 134, the annular portion 134 being provided with, or threadedly receiving, a pair of oppositely disposed, axially extending pins 136. The intermediate disk 130 is loosely journaled on the shaft 122 and is driven by the disk or collar 126 through a plurality of (preferably four) springs 138, the springs of each pair being secured at their adjacent ends to a pin 136 and at their opposite ends to a pair of the pins 128, as clearly shown in Figs. 7 and 8. The disk 130 is also driven by the disk or collar 126 through a second agency, viz., a felt collar 140 interposed between the set back inner extremity of the sleeve 120 and the central disk-like portion 132 of the disk 130. This arrangement of driving connections between the disks 126 and 130 serves to iron out fluctuations in the driving speed of the pressed gear 112, particularly with reference to sudden changes in such speed, and to prevent driving reaction between the elements. By eliminating this driving reaction the tendency of the gear 118 to drive the gear 94 is eliminated and the clashing of the teeth of these gears thereby is prevented.

A fly wheel 142 is yieldably coupled to the disk 130 by means of a felt collar or annulus 144, one end surface of which is adhesively secured to the rear surface of the central disk-like portion 132 of the disk 130; and the other end surface of which is adhesively secured to a ring or annulus 146. The ring or annulus 146 is secured to the web of the fly wheel 142 by a plurality of angularly disposed, axially extending pins 148 (as best seeen in Figs. 4 and 6), the pins 148 causing the fly wheel to rotate with the ring 146 but permitting the fly wheel to be axially moved out of engagement with said ring. The shaft 122 is rotatably secured to the fly wheel 142 by means of a set screw 150 passing through the hub of the fly wheel and being received in an elongated keyway or axial groove 152 in said shaft, this connection permitting the fly wheel to be adjusted axially of the shaft 122 to vary the degree of compression of the felt annulus 144, thereby varying the tightness of coupling between the disk 130 and the fly wheel. By varying the rigidity or flexibility of this coupling the filter mechanism may be adjusted to operate at its maximum efficiency in regard to the elimination of flutter caused by changing motor speeds. It is possible by adjusting the fly wheel axially of the shaft 122 to cause the flutter of the drive mechanism to be transmitted to the sound sprocket 62. This having been done, the fly wheel 142 may then be moved axially in the opposite direction to a point at which the fluttering of the sprocket ceases. By adjusting the mechanism in this manner the tendency of the fly wheel to lag or overdrive is eliminated and the constancy of speed of the drive sprocket 62 is materially improved. The felt annulus between the intermediate disk 130 and the fly wheel 142 also serves to prevent transmission of the noises of vibration of the driving mechanism to the fly wheel 142 and the sprocket 62.

One of the pins 136 is axially elongated and passes through an opening 154 in the web of the fly wheel, the opening 154 being in diameter substantially three times the diameter of this pin 136 and serving to limit relative angular or rotative displacement between the fly wheel and the intermediate disk for the protection of the felt annulus 144.

The sprocket shaft 122 at its sprocket-receiving end is journaled in the bearing or bushing 124 which extends forwardly from the sleeve 120 through the central opening in a boss 156 formed in the body casting 22; and the other end of the shaft 122 is journaled in a bearing or bushing 158 carried by an inverted V-shaped bracket 160 detachably secured to lugs 162 formed upon and extending upwardly from the base 20, as best seen in Figs. 2 and 5.

As before stated, the sound sprocket 62 drives the film 32 at a constant speed between a fixed sound gate 58 and a self-alining, movable sound gate 60. The fixed sound gate 58, as seen in Fig. 14, comprises a substantially rectangular plate having a narrow, light transmitting sound aperture 164 and a plurality of film engaging, friction reducing ribs 166, 168 and 170 extending in the direction of movement of the film. The ribs 166 and 168 are spaced apart a sufficient distance to engage the film adjacent the edges of the sound track, and the rib 170 is spaced from the rib 168 to engage the film in the line of the sprocket holes. The movable sound gate 60 comprises a substantially rectangular plate having a substantially U-shaped, light transmitting recess 172 extending inwardly from one edge of the plate, and a plurality of film engaging, friction reducing ribs 174, 176 and 178, similar to the ribs 166, 169 and 170 in the fixed plate 58 and similarly spaced to engage the film adjacent the opposite edges of the sound track and in the line of the sprocket holes.

The gate 58 is immovably secured to the outer end of a casting 180 having a split tubular portion 182, the sound aperture 164 being concentrically alined with respect to the axis of said tubular portion. The casting 180 is secured in any convenient manner, as for example by means of screws 184 and pins 186, to the body casting 22. The split tubular portion 182 of the casting 180 clampingly receives the forward end of a lens mounting tube 188, the end of this lens mounting tube being supported in the front wall of an exciter lamp housing 190.

The self-adjusting, self-alining, movable gate 60 is flexibly mounted upon a bracket 192 by means of a plurality of resilient wires or spring strips 194 of a suitable material, preferably piano wire, slidably received in openings extending through the bracket 192 and adjustably secured thereto by set screws 196 and 198. The gate 60 is secured to the wires 194 by small screws 200 passing through the loop end portions of said wires and threadedly received in nuts 202 and suitable threaded openings 204 in the gate 60. The bracket 192 is slidably mounted upon a pin or small rod 206 and adjustably secured to a slidable rod 208, suitable openings being provided in said bracket to receive said pins or rods and a set screw 210 threaded into the bracket and clamping the same to the rod 208.

The rod 208 is slidable in a longitudinal opening 212 in the casting 180 parallel to the tubular portion 182, and said rod is provided at its inner end with a transversely extending handle portion 214. The rod 208 is resiliently retained in its rearward position, with the movable gate 60 engaging the film (as shown in Fig. 10), by a spring 216 bearing at one end against the rear face of the casting 180, and at its other end against a collar 218 secured to, or formed upon, the rod 208. Intermediate its ends, within the opening 212, the rod 208 is reduced in diameter as at 220 to provide a pair of locking shoulders 222. A locking pin 224 is slidably mounted in a transverse bore in the casting 180, the enlarged head 226 of the pin seating in a countersunk portion 228 of the transverse bore beneath the rod 208. A spring 230 seated in a recess 232 at the outer end of the transverse bore bears against a thumb nut 234 threaded upon the outer end of the pin 224. When the rod 208 is moved forwardly by the handle portion 214 against the action of the spring 216 to open the gates 58 and 60, the pin 224 will be urged outwardly by this spring 230 and cause the enlarged head 226 lockingly to engage the shoulders 222 of the pin 208 thereby holding the gate in open position until the pin 224 is depressed to release its enlarged head from said shoulders when the spring 216 will automatically close the gates.

The tension exerted on the film by the movable gate 60 may be adjusted by loosening the set screw 210 and moving the bracket 192 in the desired direction along the rod 208 and pin 206. Movement of the bracket 192 in a direction away from the fixed gate 58 reduces the tension exerted by the spring 216 and the resilient wires 194 upon the movable gate 60, and movement of the bracket inwardly relative to the fixed gate has the opposite effect.

The full "floating" characteristic of the mounting for the sound gate 60 is of particular importance. This floating characteristic, which is obtained by the use of piano springs 194, serves to prevent ripple noises which are produced by a film in which the sprocket holes, being worn, have become flexed laterally so as to present little edges that, in successively passing and pressing against the aperture gates, cause the introduction of rhythmic vibrations or ripples. The vibrations heretofore caused by these worn and laterally flexed edges of the sprocket holes are absorbed by the flexible mounting of the sound gate 60, which therefore prevents vibration of the film in its passage across the plate apertures and thereby eliminates said ripple noises.

The emulsion on a motion picture film does not wear equally and it is often found that such film varies in thickness from side to side of the film and this variation in thickness, in prior art machines, causes the film to become misalined relative to the light transmitting apertures in the sound gates, and also causes the motion of the film to become somewhat "jerky." The flexibility of applicant's mounting means for the sound gate 60 permits this gate to compensate for this variation in the depth of the emulsion caused by wear and thereby permits the film to move evenly and without jerk between the sound gates. This compensation for the wear of the emulsion is accomplished by reason of the fact that the sound gate 60 is free to tilt in any direction and automatically alines itself with the face of the film.

Applicant's sound gate, comprising the fixed gate 58 and the self-alining, flexibly mounted gate 60, permits the direct projection of the light from the lamp through a 16 m. m. film to the photocell, as distinguished from conventional apparatus in which the light is projected indirectly through prisms or the like to the photocell. The direct projection of the light through the film to the photocell permits the use of a light projecting sound lens having a smaller light transmitting slit giving greater definition. The power of the exciter lamp may also therefore be less than in conventional 16-m. m. apparatus, with a consequent reduction in the temperature of the film.

The guide roller 56 above the sound gates 58 and 60 is mounted upon a stud 236 between a collar 238 fixed thereto by a set screw 240, and a spring 242 bearing against a shoulder of the stud and against the guide roller, the collar 238 being adjusted properly to aline the roller relative to the sound gates. The roller 56 is provided with annular flanges 244, 246 and 248, the annular flanges 244 and 246 engaging the film adjacent opposite edges of the sound track, and the flange 248 engaging the film in the line of the sprocket openings.

The exciter lamp housing 190 is provided with a hinged cover 250 to permit removal and insertion of an exciter lamp 252 mounted in a bracket 254 (Figs. 1, 3 and 4), which bracket has a split collar portion 256 in which the lamp is clamped by a set screw 258 threadedly received in one of a pair of radially extending flanges or lugs 260 formed on the collar 256. The bracket 254 is further provided with a laterally extending arm or lug 262 beneath the collar 256 for receiving and supporting a lamp terminal 264, the terminal 264 being mounted in an insulating bushing 266 received in an opening 268 in the arm 262 and held against downward movement by an annular flange 270 at its upper end. The terminal 264 is connectible by a wire 272, which carries at its outer end a plug 274, to a jack 276 to which one end of the supply circuit for the exciter lamp is connected. The other side of the supply circuit for the lamp is grounded to the frame of the machine and is connected by the bracket 254 to the other terminal of the lamp. The bracket 254 at its outer edge is provided with a pair of outwardly directed arms 255 (Fig. 1), forming therebetween a square or polygonal groove 278 slidably receiving a square or polygonal bar 280, upon which the bracket 254 is adjustable by means of a thumb screw 282 threadedly received in the upper end of the bar 280, the thumb screw 282 being held against longitudinal movement relative to the bracket 254 by a plate 284 having a pair of spaced arms engaging in an annular groove 286 in the head of said thumb screw. A set screw 287 holds the bar 280 and bracket 254 in adjusted position vertically and a cover plate 288 secured to the outer edges of the arms 255 prevents lateral movement of the bracket relative to said bar. The bar 280 is fixedly secured at its lower end in any suitable manner to a similar bar 290 which extends rearwardly of the machine in a direction perpendicular to the bar 280. The bar 290 is slidably received in a groove 292 formed by a pair of downwardly depending arms 294 (Fig. 3) of a bracket 296. A cover plate 298 secured to the bottom edges of the arms 294 supports the bar 290 in the groove 292. A thumb screw 300, threadedly received in the rearward end of the bar, provides means for adjusting said bar forwardly and backwardly in the groove 292 and the thumb screw is secured against longitudinal movement relative to the bracket 296 by a plate 302 secured to the bracket and having spaced arms engaging in an annular groove 304 in the head of said thumb screw. A set screw 306 (Fig. 1) provides means for locking the bar 290 in adjusted position. The exciter lamp mounting, comprising the brackets 254 and 296 and the bars 280 and 290, is removable and replaceable as a unit with said lamp. For this purpose the bracket 296 is provided with an opening 308 transverse to the groove 292 for slidably mounting the bracket on a bar 310 fixedly secured in a boss 312 extending laterally from the body casting 22. A set screw 314 threaded in a suitable opening in the upper edge of the bracket provides means for locking the bracket to the bar 310.

This exciter lamp mounting unit just described provides means for quickly and simply replacing a defective exciter lamp and for adjusting the lamp to the proper position relative to the film and a photoelectric cell 315 (Fig. 9) mounted within a housing 316 on the body casting 22. The housing 316 has a suitable aperture 317 in alinement with the apertures 164 and 172 in the sound gates 58 and 60, respectively, and in alinement with the usual slit (not shown) in a sound lens mounted in the tube 188. The filament of an exciter lamp must be maintained in absolute alinement with the aperture in the fixed gate and the slit in the lens, and the slightest sag which takes place when a filament becomes hot destroys this alinement. The thumb screw 282 of the mounting means provides readily manipulatable means for compensating for this sag of the filament to bring it into proper alinement with the aperture in the fixed gate and the slit in the lense. Lateral alinement may be effected by releasing the set screw 314 and moving the bracket 296 longitudinally of the bar 310.

If the filament of the exciter lamp is too far away from the film and the photoelectric cell, the beam impinging on said cell will be blue, while if it is too close the beam will be brown. However, in order to be successfully used or to be used with the greatest efficiency, the beam impinging on the photocell should be white and of the proper intensity. The thumb screw 300 provides readily manipulatable means for moving the filament toward and away from the film and photocell in order that the beam impinging thereon may be white and of the proper intensity.

When an exciter lamp burns out the same can be readily removed by merely loosening the set screw 314, sliding the bracket 296 off the bar 310 and pulling the plug 274 out of the jack 276. A similar mounting unit, ready for use, can be instantaneously substituted by merely inserting the plug 274 thereof into the jack 276, pushing the bracket 296 on the bar 310 and locking the set screw 314. All that remains to be done is to adjust the filament of the lamp relative to the light apertures, the film and the photocell, and this can be readily accomplished, as aforestated, by manipulation of the set screws 282 and 300.

The projector lamp housing 46 is provided in its base with an opening in communication with an air duct 318 (Fig. 1) mounted on the body casting 22. This air duct directly connects to the air pump in the pump housing 80 shown in Fig. 2. Air, therefore passes from the pump to the duct 318 in the housing 46 to cool the projector lamp, and passes out of the housing through an opening at the top thereof. Suitable means (not shown) are provided to cause the air to circulate between the housing and a perforated screen 320 (Fig. 1) thereby cooling the housing.

As shown in Figs. 2 and 5, the motor driven shaft 88 is connected by the pressed gear 92 and a gear 322 to a rewind shaft 324. The shaft 324 is detachably connected by any suitable coupling to a shaft 326 carried by the take-up reel bracket 26. The shaft 326 is connected to one end of a flexible shaft 328, which in turn is connected at its other end to a shaft 330 journaled in a boss formed on the bracket 26, the shaft 328 being coupled to the shafts 326 and 330 in any suitable manner as by couplings 332 and 334. The shaft 330 drives the take-up reel shaft 336, journaled in the bracket 26, through a pair of interengaging friction disks 338, one of which is movable out of engagement with the other to permit the film to be rewound from the take-up reel 30 to the supply reel 28, as shown in Fig. 2. The supply reel shaft 340 journaled in the supply reel bracket 24 is rotated for the rewinding of the reel through a pair of intermeshing gears 342 and 344, the gear 344 being the larger and being journaled on a fixed shaft 346 also carried by the bracket 24. The gear 344 is provided with an operating handle 348 and is normally held out of engagement with the gear 342 by a small spring (not shown) interposed between the rear face of the gear and the bracket 24. The film having been run from the supply reel through the machine for the projection of the pictures and the reproduction of the sound records thereon, the film is passed directly from the take-up reel back to the supply reel; the movable friction clutch 338 is disengaged from its companion element and the handle 348 pressed inwardly and rotated to cause the film to rewind upon the supply reel, as shown in Fig. 2.

The shaft 110 which drives the picture shutters and the picture sprocket 48 extends rearwardly beyond the rear end of the body casting 22 and carries on its extended end a knurled knob 350 which therefore provides means for operating the shaft 88 and the various driven mechanisms by hand whenever necessary or desirable.

A pilot lamp 352 to assist in the threading of the machine in a dark room is pivoted to a bracket 354 and normally lies behind the air duct 318. This lamp may be rotated on its pivot outwardly of the body casting and is so designed, and the reflector is so dimensioned, that the light from said lamp will not strike upon the photocell during the threading of the film.

A handle casting 356 (Fig. 1) may be bolted to the upstanding forward portion of the body casting 22 to provide means for transporting the machine from place to place as may be desired.

Changes may be made in the form, construction and arrangement of the parts without departing from the spirit of the invention or sacrificing any of its attendant advantages, and the right is hereby reserved to make all such changes as fairly fall within the scope of the following claims.

The invention is hereby claimed as follows:

1. In means for driving a film, a source of power, a drive shaft, film feeding means secured to said shaft, a fly wheel secured to said shaft and alone driving said shaft, driving connections between said fly wheel and said source of power, said connections comprising means for preventing the fly wheel from exerting a driving reaction upon said connections.

2. In means for driving a film, a source of power, a drive shaft, a drive sprocket secured to said shaft, a fly wheel secured to said shaft and alone driving said shaft, driving connections between said fly wheel and said source of power, said connections comprising means for absorbing the noises of the driving connections and preventing transmission of the same to said fly wheel, said drive shaft and said drive sprocket.

3. In driving means for a motion picture film or the like, film feeding means, a drive shaft upon which said means is secured for rotation therewith, a fly wheel secured to but adjustable axially of said shaft and alone driving said shaft, power driven means comprising a rotatable member loosely journaled on said shaft, and flexible connecting means between said member and said fly wheel.

4. In driving means for a motion picture film or the like, film feeding means, a drive shaft upon which said means is secured for rotation therewith, a fly wheel secured to but adjustable axially of said shaft and alone driving said shaft, power driven means comprising a rotatable member loosely journaled on said shaft, and axially compressible means for connecting the rotary member to the fly wheel whereby the degree of coupling between said rotary member and said fly wheel may be varied by axial adjustment of said fly wheel.

5. In driving means for a motion picture film or the like, film feeding means, a drive shaft upon which said sprocket is secured for rotation therewith, a fly wheel secured to but adjustable axially of said shaft and alone driving said shaft, power driven means comprising a rotatable member loosely journaled on said shaft, and means connecting said rotary member to said fly wheel, said means comprising a member of sound deadening material for absorbing the noises of the power driving means and preventing transmission of the same to said fly wheel, said drive shaft and said film feeding means.

6. In driving means for motion picture film or the like, a drive shaft, a drive sprocket secured to said shaft for rotation therewith, a fly wheel secured to said shaft and alone driving said shaft, a rotary member loosely journaled on said shaft, means comprising a member of sound deadening material coupling said rotary member to said fly wheel, power driven means for rotating said rotary member, said means comprising a second rotary member and yieldable connections between said second rotary member and the first mentioned rotary member for preventing the fly wheel from exerting a driving reaction upon said power driven means, for absorbing the operating noises of said power driven means and for preventing the transmission of the same to said fly wheel, said drive shaft and said drive sprocket.

7. In driving means for motion picture film or the like, a drive shaft, a drive sprocket secured to said shaft for rotation therewith, a fly wheel secured to said shaft and alone driving said shaft, a rotary member loosely journaled on said shaft, means comprising a member of sound deadening material coupling said rotary member to said fly wheel, power driven means for rotating said rotary member, said power driven means comprising a freely rotatable disk, spring means connecting said disk to said rotary member, and friction means additionally connecting said disk to said rotary member.

8. In driving means for motion picture film or the like, a drive shaft, a drive sprocket secured to said shaft for rotation therewith, a fly wheel secured to said shaft and alone driving said shaft, a rotary member loosely journaled on said shaft, means comprising a member of sound deadening material coupling said rotary member to said fly wheel, power driven means for rotating said rotary member, said means comprising a driving shaft, a gear carried by said driving shaft, a sleeve freely rotatable on said drive shaft and having gear teeth pressed into the periphery thereof meshing with said last mentioned gear, a disk secured to said sleeve, a plurality of angularly disposed pins extending axially of said disk, a plurality of springs connecting said axially extending pins to said rotary member for causing the same to rotate with said disk, and friction means interposed between said sleeve and said rotary member.

9. In a sound-on-film projector or the like, comprising a base portion and a body portion upstanding from said base portion, a bracket detachably secured to said base and spaced from said body portion, a drive shaft journaled in said bracket and said body portion, a film-engaging drive sprocket secured to said drive shaft, a fly wheel secured to and adjustable axially of said shaft and alone driving said shaft, a motor mounted in said base, a driving shaft journaled in said body portion and extending into said base portion, gear means connecting said driving shaft to said motor, a sleeve loosely journaled on said drive shaft, interengaging gear teeth pressed into said sleeve and into the second mentioned shaft, a disk secured to said sleeve, a plurality of angularly disposed pins extending axially from one face of said disk, a second disk loosely journaled on said shaft, a plurality of angularly disposed pins extending axially from one face of said disk toward said first mentioned disk, a plurality of springs interconnecting said axially extending pins, a ring detachably secured to said fly wheel, and an annulus of yieldable sound deadening material adhesively secured to said ring and to said second disk, whereby variations in the speed of the motor are absorbed by said fly wheel and noises generated in the operation of the driving means are absorbed by said sound deadening material, and whereby the fly wheel is prevented from exerting a driving reaction upon the driving means.

OSCAR J. HOLMES.